(12) United States Patent
Yoon et al.

(10) Patent No.: US 7,061,679 B1
(45) Date of Patent: Jun. 13, 2006

(54) LIGHT IRRADIATING DEVICE

(75) Inventors: Ki Hyuk Yoon, Seoul (KR); Young Seok Choi, Daejeon (KR); Byung Duck Song, Anyang-shi (KR); Soon Bum Kwon, Kunpo-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/432,785

(22) Filed: Nov. 3, 1999

Related U.S. Application Data (63) Continuation-in-part of application No. 09/084,583, filed on May 27, 1998.

(30) Foreign Application Priority Data

Nov. 6, 1998 (KR) .............................. 1998-47490

(51) Int. Cl.
G02B 27/28 (2006.01)
(52) U.S. Cl. ...................... 359/485; 359/487; 359/500; 349/124
(58) Field of Classification Search ................ 359/483, 359/485, 487, 488, 494, 497, 500, 352; 349/123, 349/124
See application file for complete search history.

(56) References Cited

U.S. PATENT DOCUMENTS

| 3,912,920 A | 10/1975 | Kubota ........................ 240/9.5 |
| 4,963,448 A | 10/1990 | Ichimura et al. .............. 430/20 |
| 5,604,615 A | 2/1997 | Iwagoe et al. ............... 349/124 |
| 5,705,096 A | 1/1998 | Kano et al. ............... 252/299.4 |
| 5,737,064 A * | 4/1998 | Inoue et al. ................... 355/73 |
| 5,786,041 A | 7/1998 | Takenaka et al. ............... 428/1 |
| 5,824,377 A | 10/1998 | Pirwitz et al. ................. 428/1 |
| 5,856,430 A | 1/1999 | Gibbons et al. ............ 528/353 |
| 5,856,431 A | 1/1999 | Gibbons et al. ............ 528/353 |
| 5,880,803 A | 3/1999 | Tamai et al. ................. 349/156 |
| 5,889,571 A | 3/1999 | Kim et al. ................... 349/124 |
| 5,928,561 A | 7/1999 | Bryan-Brown et al. .. 252/299.4 |
| 5,934,780 A * | 8/1999 | Tanaka ........................ 359/487 |
| 6,142,633 A | 11/2000 | Takahara et al. .............. 353/20 |
| 6,190,016 B1 * | 2/2001 | Suzuki et al. ................. 362/19 |
| 6,191,836 B1 | 2/2001 | Woo et al. ................... 349/124 |
| 6,285,427 B1 | 9/2001 | Lee et al. |

FOREIGN PATENT DOCUMENTS

| DE | 197 03 682 A1 | 8/1997 |
| EP | 0 261 712 A1 | 3/1988 |
| EP | 0 549 283 A2 | 6/1993 |
| EP | 0 635 748 A1 | 1/1995 |
| EP | 0 708 354 A1 | 4/1996 |

(Continued)

OTHER PUBLICATIONS

Introduction to Modern Optics, 2nd ed., Fowles, G., Dover Publications, Inc., New York, pp. 27-28.*

(Continued)

*Primary Examiner*—Mark A. Robinson
*Assistant Examiner*—Lee Fineman
(74) *Attorney, Agent, or Firm*—McKenna Long & Aldridge LLP (57) ABSTRACT

A light irradiating device for a photo-alignment process comprises an optical system and a first polarizer polarizing the light from the optical system. The light from the first polarizer is obliquely irradiated at an angle with respect to a normal direction of a stage on which a substrate is placed.

27 Claims, 9 Drawing Sheets

FOREIGN PATENT DOCUMENTS

| | | |
|---|---|---|
| EP | 0 742 471 A2 | 11/1996 |
| EP | 0 788 012 A2 | 8/1997 |
| FR | 2 755 518 | 5/1998 |
| GB | 2 309 794 A | 8/1997 |
| GB | 2 317 964 A | 4/1998 |
| GB | 2 319 093 A | 5/1998 |
| JP | 2-055330 | 2/1990 |
| JP | 03-120503 | 5/1991 |
| JP | 03-241311 | 10/1991 |
| JP | 05-19208 | 1/1993 |
| JP | 07-318861 | 12/1995 |
| JP | 7-318942 | 12/1995 |
| JP | 9-211465 | 8/1997 |
| JP | 9-265095 | 10/1997 |
| JP | 9-318946 | 12/1997 |
| JP | 10-90684 | 4/1998 |
| JP | 10-90684 A | 4/1998 |
| JP | 10-154658 | 6/1998 |
| JP | 10-161126 | 6/1998 |
| JP | 10-332932 | 12/1998 |
| JP | 11-194344 | 7/1999 |
| JP | 11-194345 | 7/1999 |
| KR | 0169063 | 9/1997 |
| KR | 1998-024518 | 7/1998 |
| KR | 0169063 | 10/1998 |
| WO | 94/28458 | 12/1994 |
| WO | 95/18989 | 7/1995 |
| WO | 95/22075 | 8/1995 |
| WO | WO 95/34843 | 12/1995 |
| WO | WO 99/08148 A1 | 2/1999 |

OTHER PUBLICATIONS

Jenkins, et al., *Fundamentals of Optics*, Third Edition, copyright 1957, pp. 492-493.

Lim, et al., "Tilting of Liquid Crystal through Interaction with Methyl Orange Molecules Oriented by Circularly Polarized Light," *Japanese Journal of Applied Physics*, pp. L1281-L1283, Oct. 1, 1996.

Eugene Hecht; "*OPTICS*"; 1987; pp. 298-299.

Abstract of DE19819775, which is the equivalent of U.S. Appl. No. 6,285,427.

Abstract of DE19703682, which is the equivalent of U.S. Appl. No. 5,889,571.

* cited by examiner

Exposure Area

LIGHT IRRADIATING DEVICE

CROSS REFERENCE TO RELATED APPLICATIONS

The application is a Continuation-in-Part of U.S. patent application Ser. No. 09/084,583 filed on May 27, 1998 and this application also claims the benefit of Korean Patent Application No. 1998-47490, filed on Nov. 6, 1998, which is hereby incorporated by reference for all purposes as if fully set forth herein.

BACKGROUND OF THE INVENTION

1. Field of the Invention

The present invention relates to a light irradiating device, and more particularly, to a large scale light irradiating device which is used in a photo-alignment process of a multi-domain liquid crystal display device.

2. Description of the Related Art

Generally, a multi-domain liquid crystal display device comprises upper and lower substrates placed to face each other with a specific gap provided by a spacer, and a liquid crystal layer is formed between the upper and lower substrates. The upper and lower substrates respectively have an electrode of specific patterns on one side, and an alignment layer, which determines the alignment of the liquid crystal, is formed on the electrodes.

A rubbing method or a photo-alignment method or the like is used as an alignment method treating the alignment layer. The rubbing method is composed of coating an alignment material, e.g., polyamide (PI), on a substrate, and then rubbing the substrate mechanically with a rubbing cloth. From the above process, an alignment direction of liquid crystal molecules on the substrate is obtained. This method enables an LCD to be made on a large scale and to be treated rapidly.

In the rubbing process described above, however, the alignment of liquid crystal molecules is not uniform because the figure of microgrooves formed in the alignment layer varies by rubbing strength. And this causes light scattering and random phase distortion. Also, dust particles and electrostatic discharge produced by rubbing causes a decrease in yield, and the repeated photolithography process for realizing multi-domain by pixel division effects the reliability and stability of the alignment layer.

On the other hand, the photo-alignment method determines the pretilt of liquid crystal (LC) by irradiating ultraviolet light over a substrate having a photo-alignment layer. Compared with the rubbing method, neither electrostatic discharge nor dust particles are produced, so the manufacturing yield is maintained. Especially, by this method, realization of a wide-viewing angle LCD by pixel division is made possible.

The above light irradiating device used in a photo-alignment process is disclosed in JP-A-10-90684 (published Apr. 10, 1998) and JP-A-10-161126 (published Jun. 19, 1998).

Figure 1:
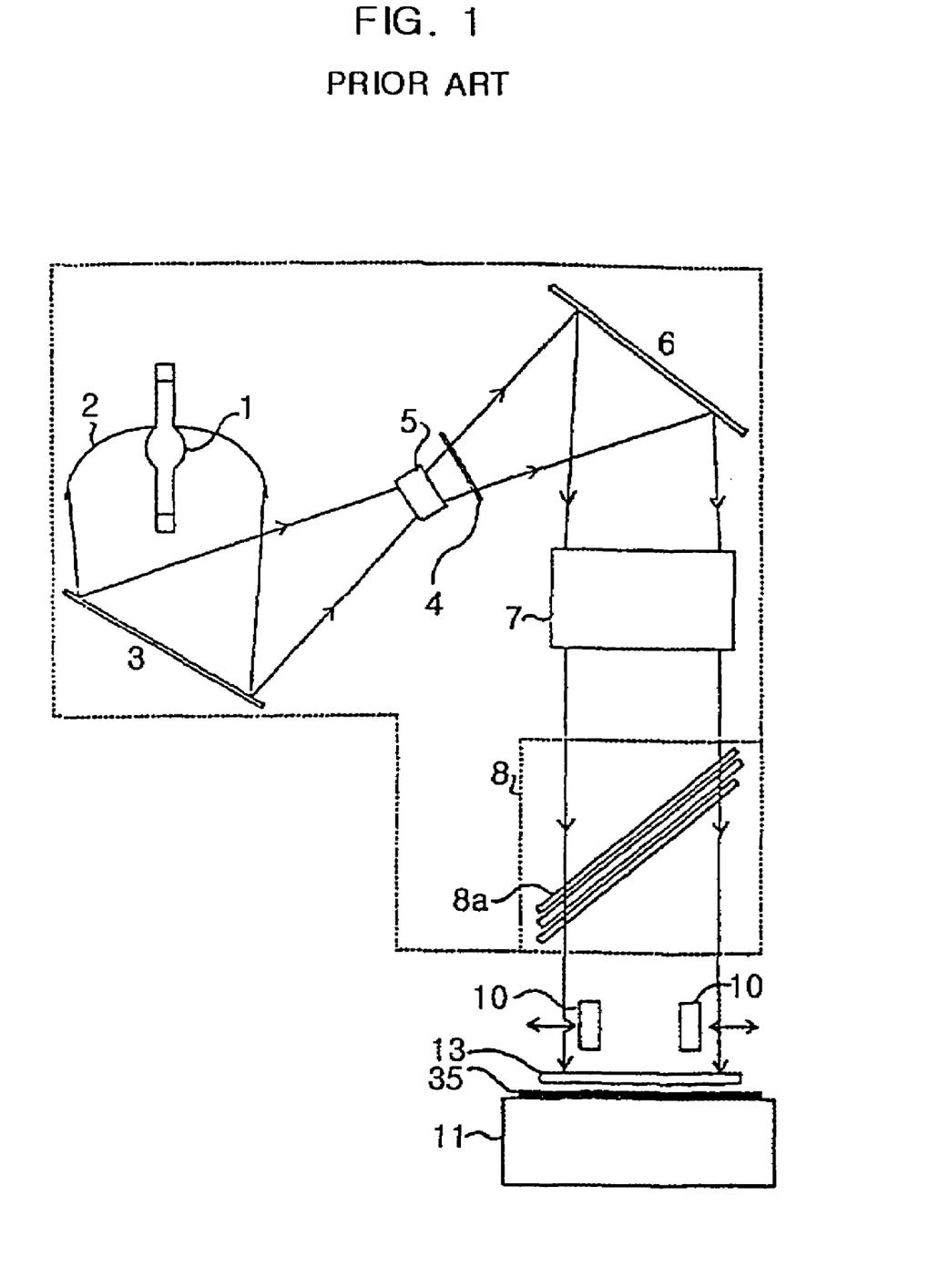
FIG. 1 shows a conventional light irradiating device.

FIG. 1 is a configuration of the conventional light irradiating device in JP-A-10-90684, which relates to a polarized-light irradiating device used for irradiating polarized light on the alignment layer of LCD in a photo-alignment process for the alignment layer.

The light-containing ultraviolet light emitted from a light source 1 is concentrated at a condensing mirror 2, reflected at a first reflective mirror 3, and then goes through a condensing lens 5. The light from the condensing lens 5 via a shutter 4 is reflected at a second reflective mirror 6, made to be in parallel by a collimating lens 7, and then passes to a polarizer 8. The polarizer comprises a plurality of glass plates 8a which are placed in parallel at a fixed interval, and placed with Brewster's angle with respect to incident light. It reflects most vertically polarized light and transmits horizontally polarized light. Horizontally polarized light from the polarizer 8 is irradiated on substrate 35 by way of mask 13.

In the light irradiating device which has the configuration mentioned above, the polarization ratio (s/p, wherein s is vertically polarized light, p: horizontally polarized light) is set to be less than 0.1. In order to apply photo alignment to an alignment layer of the LCD, polarized lights having the same polarizing direction are irradiated. And this device is excellent in transmittance, wavelength dependency, durability and life duration. But, to produce a large scale LCD, the glass plate 8a of the polarizer 8 has to be large. And the range of polarization ratio of this device is inappropriate to conduct the photoalignment process effectively.

Figure 2:
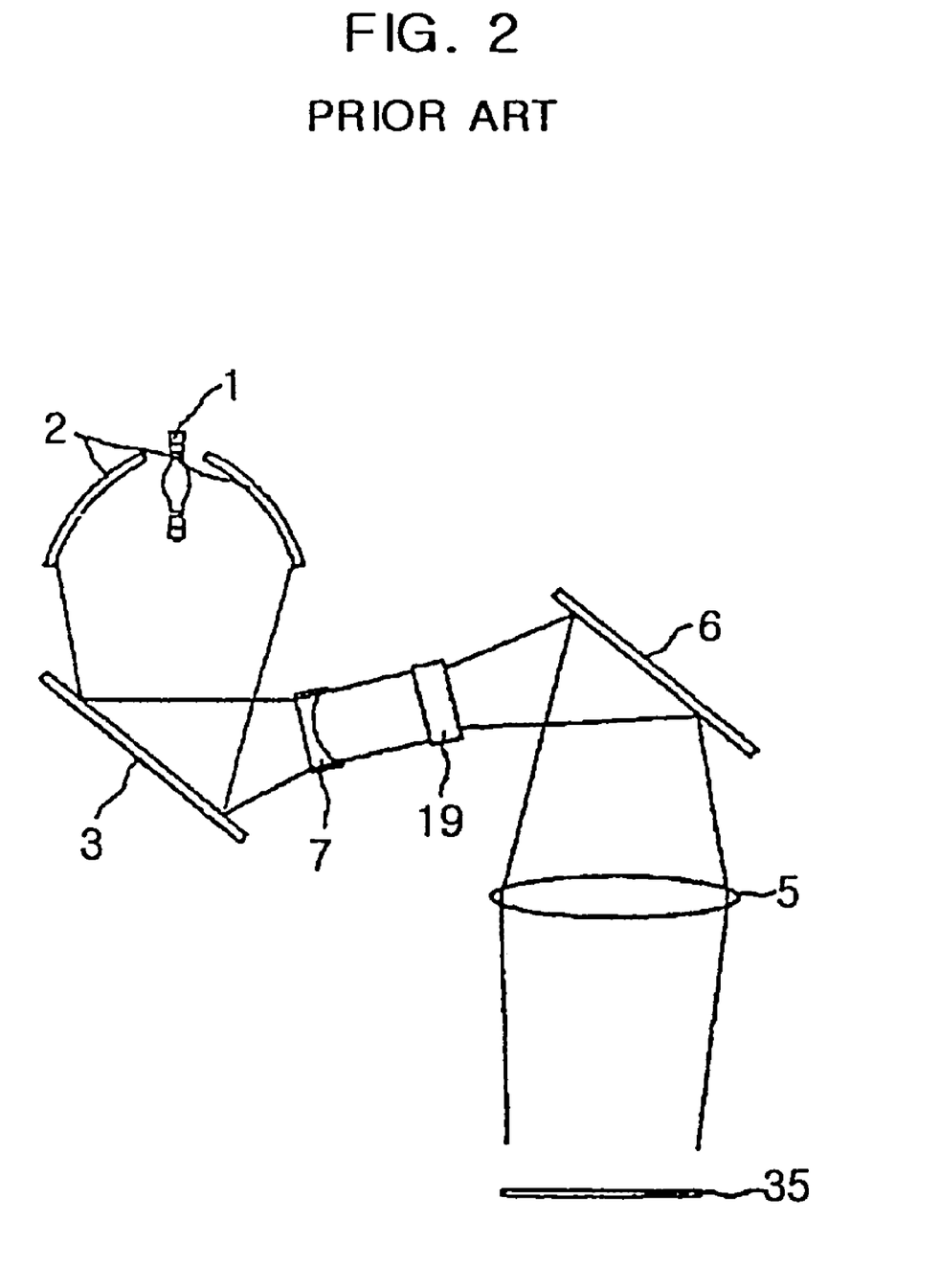
FIG. 2 shows another conventional light irradiating device.

FIG. 2 is a schematic diagram of the configuration of a conventional light irradiating device, described in JP-A-10-161126, where an exposure device comprises light source 1, condensing mirror 2, collimating lens 7, homogenizer 19, condensing lens 5, one or more reflective mirror(s) 3, 6 leading the light from the light source 1 to a substrate 35. And at least one reflective mirror therein comprises a reflective diffraction grating reflecting mainly the first polarized light.

Because the first reflective mirror 3 is generally smaller in scale than the second reflective mirror 6, when the first reflective mirror 3 is composed of a diffraction grating, the diffraction grating on a small scale can be used. Since the diffraction grating is located before the homogenizer 19, light through the homogenizer is prevented from being affected by the diffraction grating.

By the configuration described above, the light irradiating device can irradiate polarized light on a large scale at once by irradiating reflected light from a reflective diffraction grating reflecting mainly the first polarized light. The polarization characteristic of the diffraction grating in the light irradiating device, however, depends greatly on wavelength.

The above prior art is inappropriate for the actual photo-alignment process because it is focused on annexing polarizing devices to the conventional light irradiating devices to obtain polarized light.

SUMMARY OF THE INVENTION

An object of the present invention is to provide a light irradiating device which is able to irradiate on a large scale, and determines an alignment direction of the alignment layer and a pretilt angle by irradiating the light obliquely.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the object of the present invention, a light irradiating device is provided which comprises an optical system and a first polarizer polarizing the light from said optical system, and the light from the first polarizer is obliquely irradiated at a specific angle with respect to the normal direction of a stage on which a substrate is placed.

The optical system comprises a light source, a lens and one or more reflective mirrors. Also, a second or third polarizer can be mounted between the lens and the reflective mirror.

To achieve the object of the present invention, a light irradiating device is provided which comprises a light source, a first reflective mirror reflecting the light from the light source, a homogenizer having a plurality of lenses, a second reflective mirror reflecting the light from the homogenizer, a collimating lens making the lights from the second reflective mirror to be in parallel, a first polarizer polarizing the light from the collimating lens, and the light from the first polarizer is obliquely irradiated at a specific angle with respect to the normal direction of a stage on which a substrate is placed.

The above light irradiating device additionally contains a second polarizer between the first reflective mirror and the homogenizer, or a third polarizer between the homogenizer and the second reflective mirror. It is preferable that the first polarizer has a high light transmittance for the light in the wavelength range of about 200 nm~800 nm, and more preferably, about 250 nm~400 nm. The first polarizer has a polarization degree (PD) of about 0~1, and preferably about 0.2~0.95. The angle (θ) is preferable to be in a range of about 0°~45°.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Hereinafter, a light irradiating device according to the present invention is described in detail referring to the drawings.

Figure 3A:
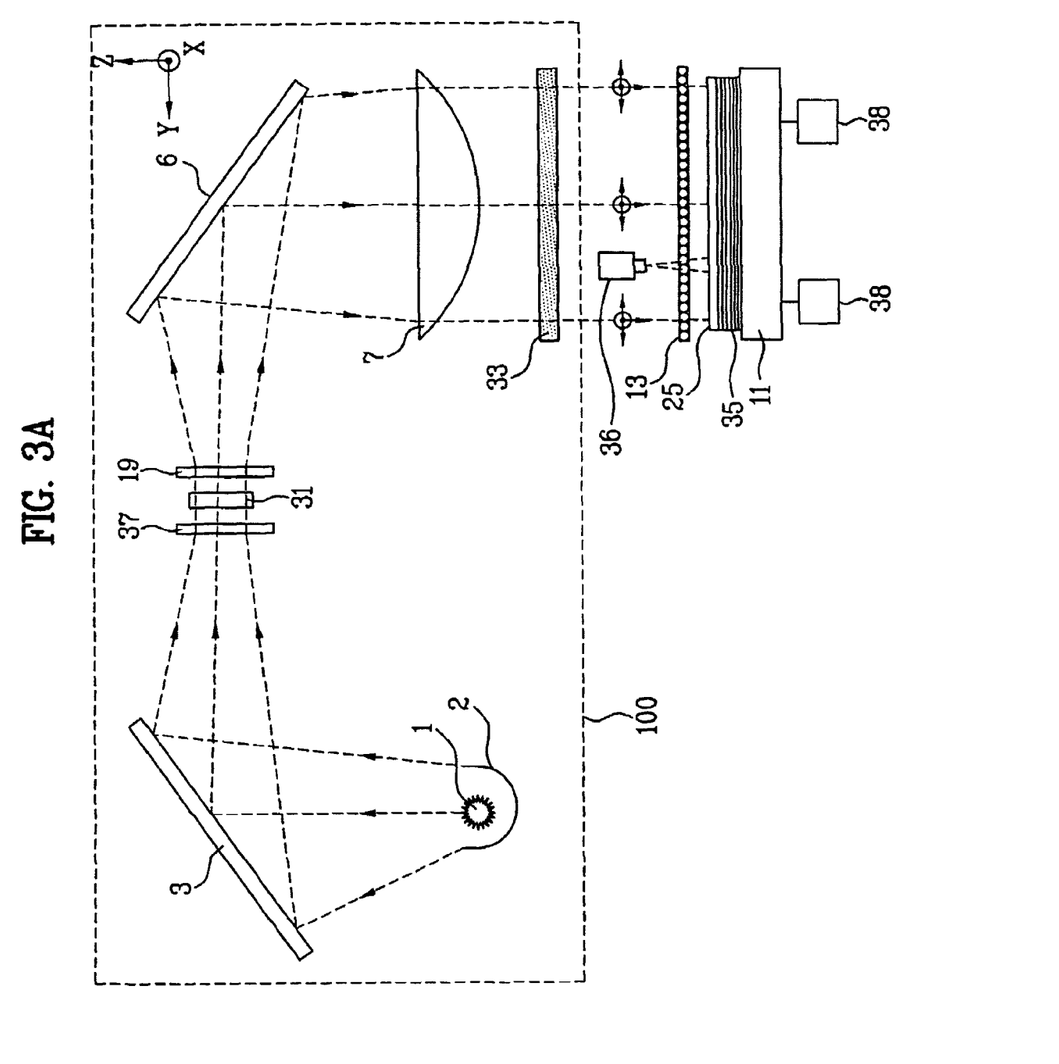
FIGS. 3A & 3B show a yz-plane view of a light irradiating device according to the present invention.
Figure 3B:
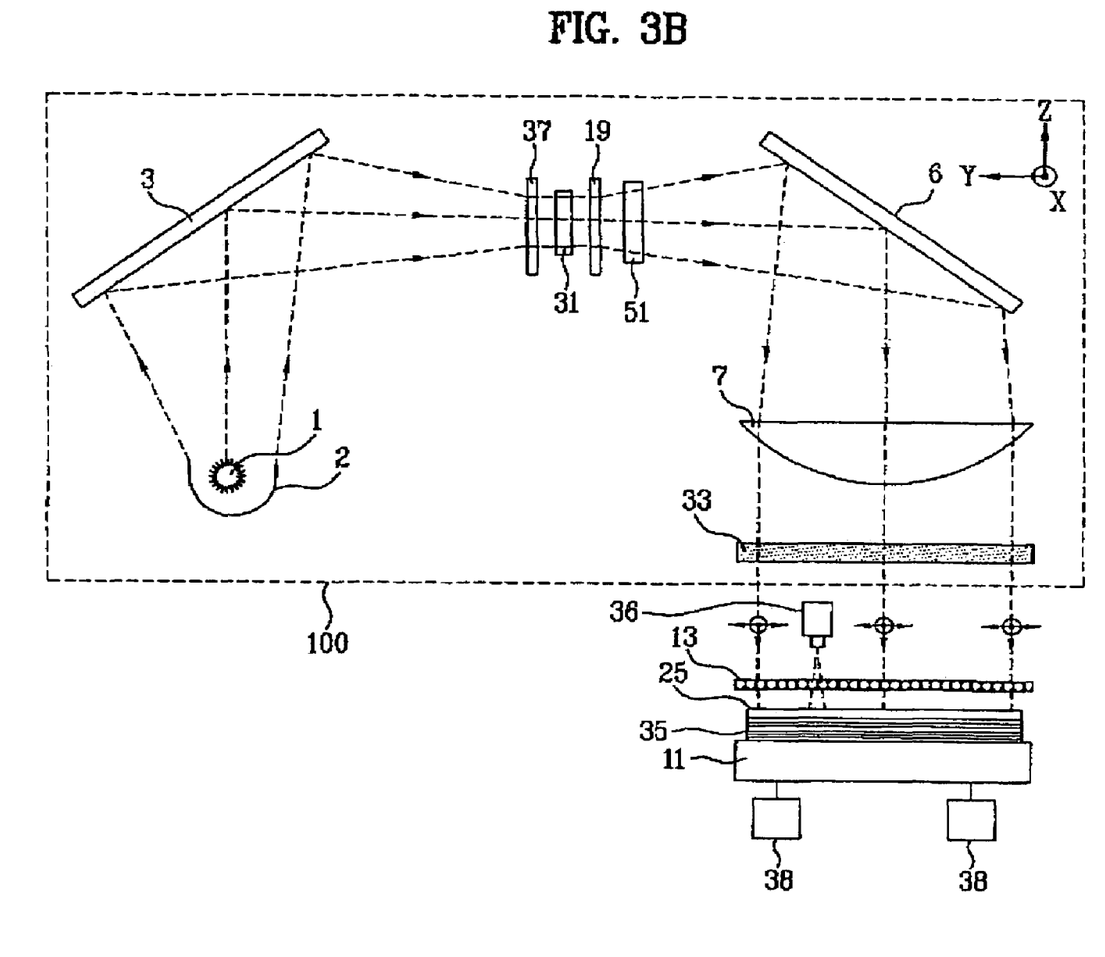
Figure 4:
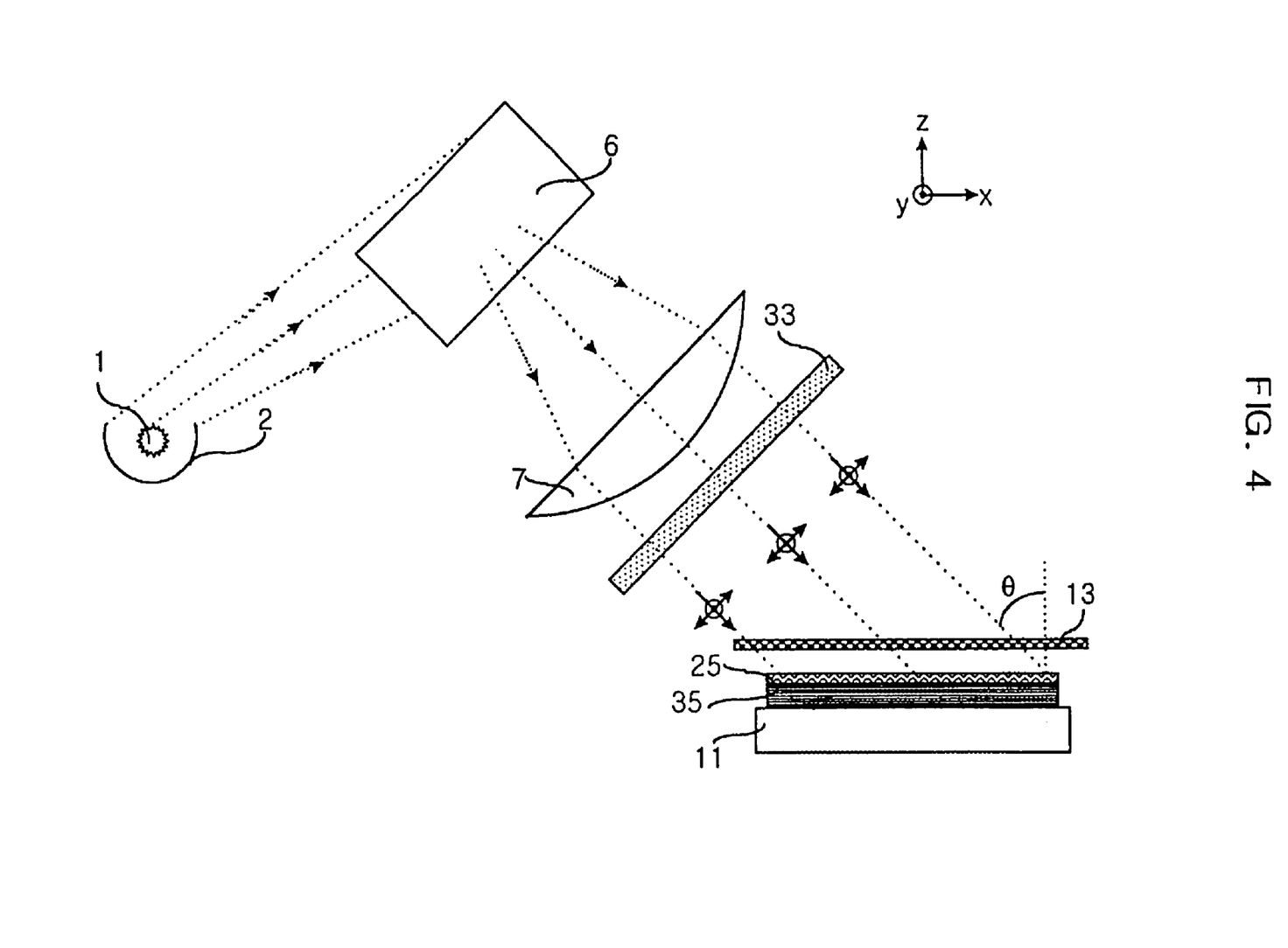
FIG. 4 is an xz-plane view of a light irradiating device according to the present invention.

FIGS. 3A–B and 4 are yz and xz-plane views of a light irradiating device according to the present invention. The light irradiating device according to the present invention comprises light source 1, condensing mirror 2, first reflective mirror 3, lens 37, small scale polarizer 31, homogenizer 19, second reflective mirror 6, collimating lens 7, mask 13, stage 11 on which a substrate 35 is placed, and polarizer 33.

The condensing mirror 2 is placed to allow the light emitted from the light source 1 to be transmitted to the first reflective mirror 3. The homogenizer (for example, a compound lens or fly eye lens) 19, which is composed of a plurality of lenses, refracts the light rays or beams from the lenses in order to overlap the light rays or beams. The second reflective mirror 6 reflects the light from the homogenizer. The collimating lens 7 makes the reflected light rays or beams from the second reflective mirror 6 to be parallel and directs them to the alignment layer 25 formed on the substrate 35. A mirror or lens can be used as collimating lens 7, and the homogenizer can be convex-type or concave-type.

The light irradiating device according to the present invention can also include a polarizer at the location of the first polarizer 33, and, if necessary, at the front side and/or back side of the homogenizer 19, such as the second polarizer 31 and third polarizer 51 (small scale polarizer) shown in FIGS. 3A and 3B.

The first, second, and third polarizers 33, 31 and 51 each comprise a polarizer substrate, which is a laminated quartz substrate, a laminated glass substrate, or a multi-coated substrate, and it is preferred to have good heat-resistance, durability, and a low wavelength dependency. A laminated quartz or glass substrate which is titled by Brewster's angle (=tan$^{-1}$n, wherein n is the index of refraction of the quartz or glass) with respect to the substrate is used. Therefore, Brewster's angle is made to be in the range of about 57°~60°. Laminated quartz or glass substrate can irradiate light uniformly in the case of large scale irradiation. A multi-coated substrate is coated with an inorganic layer, usually $SiO_2$.

Figure 8A:
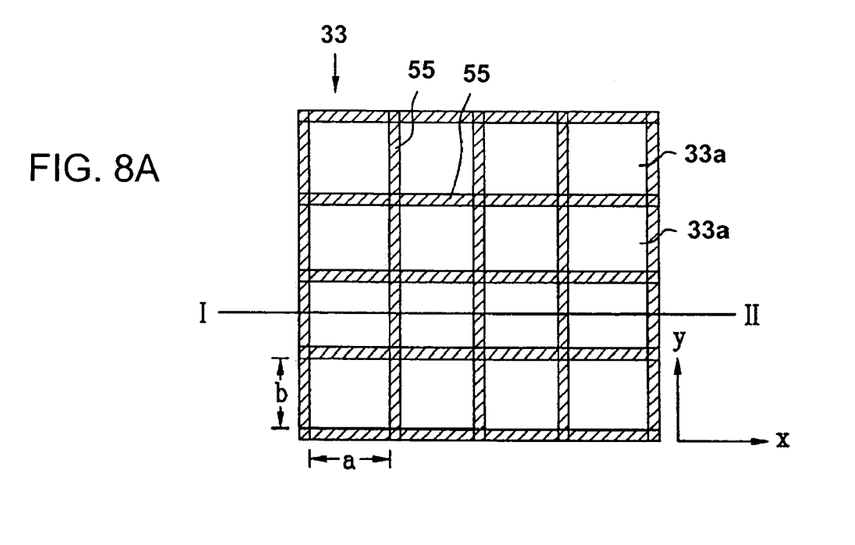
FIGS. 8A and 8B illustrate an exemplary polarizer according to the present invention.
Figure 8B:
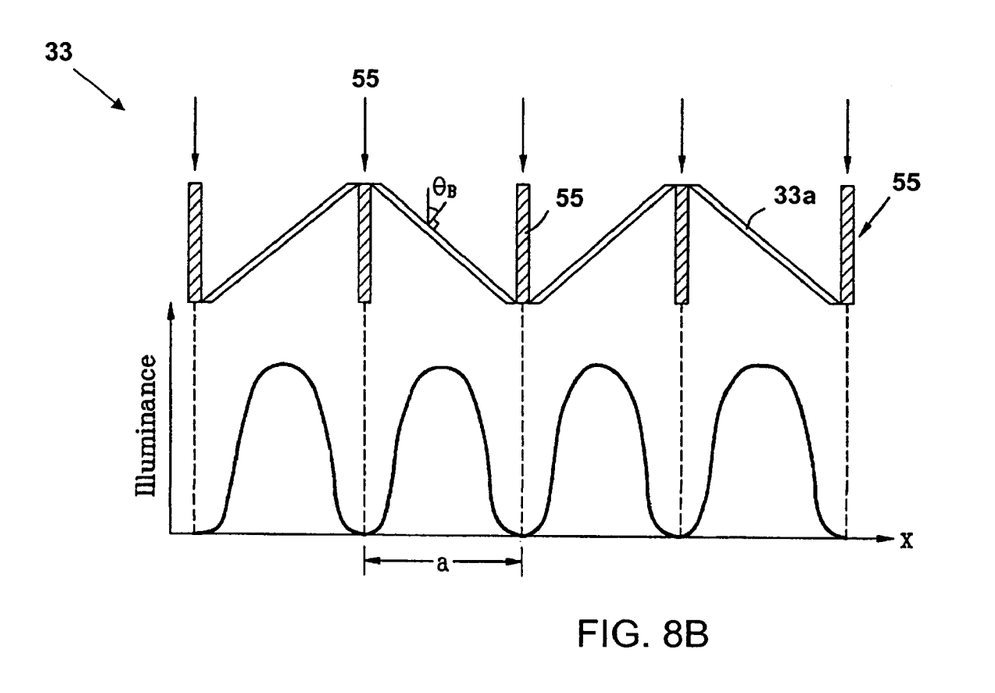

FIGS. 8A and 8B illustrate an exemplary polarizer 33. The polarizer 33 includes a plurality of glass plates 33a. The glass plates 33a may be formed in segments, which are linked together by a polarizer holder 55 that has a lattice structure. The glass plates 33a may include quartz. The polarizer holder 55 may include an optically absorptive material, wherein light reflected by the glass plates 33a is absorbed by the polarizer holder 55. The polarizer 33 illustrated in FIGS. 8A and 8B may be used for any of first, second, and third polarizers 33, 31, and 51.

It is preferable that the polarizer 33 has a high light transmittance in the wavelength range of 200 nm~800 nm, and more preferably, 250 nm~400 nm. Further, the polarization degree $$\left(PD = \frac{I\max - I\min}{I\max + I\min}\right)$$

is preferably in the range of 0<PD<1 (i.e., partially polarized light), more preferably, 0.2<PD<0.95, where Imax is a maximum intensity and Imin is a minimum intensity. And the polarization degree can be properly selected according to the type of alignment layer.

As represented in FIG. 4, showing the light irradiating device in the xy-plane, the light irradiated from the optical system 100 is declined at an angle with respect to the normal direction of a stage for slanted exposure of light, and the direction of maximum transmittance axis is perpendicular or parallel to the xz-plane of the light's route defined as in the drawing. Therefore, by composing the light irradiating device as described above, partially polarized light can be obliquely irradiated on the alignment layer 25.

Figure 5:
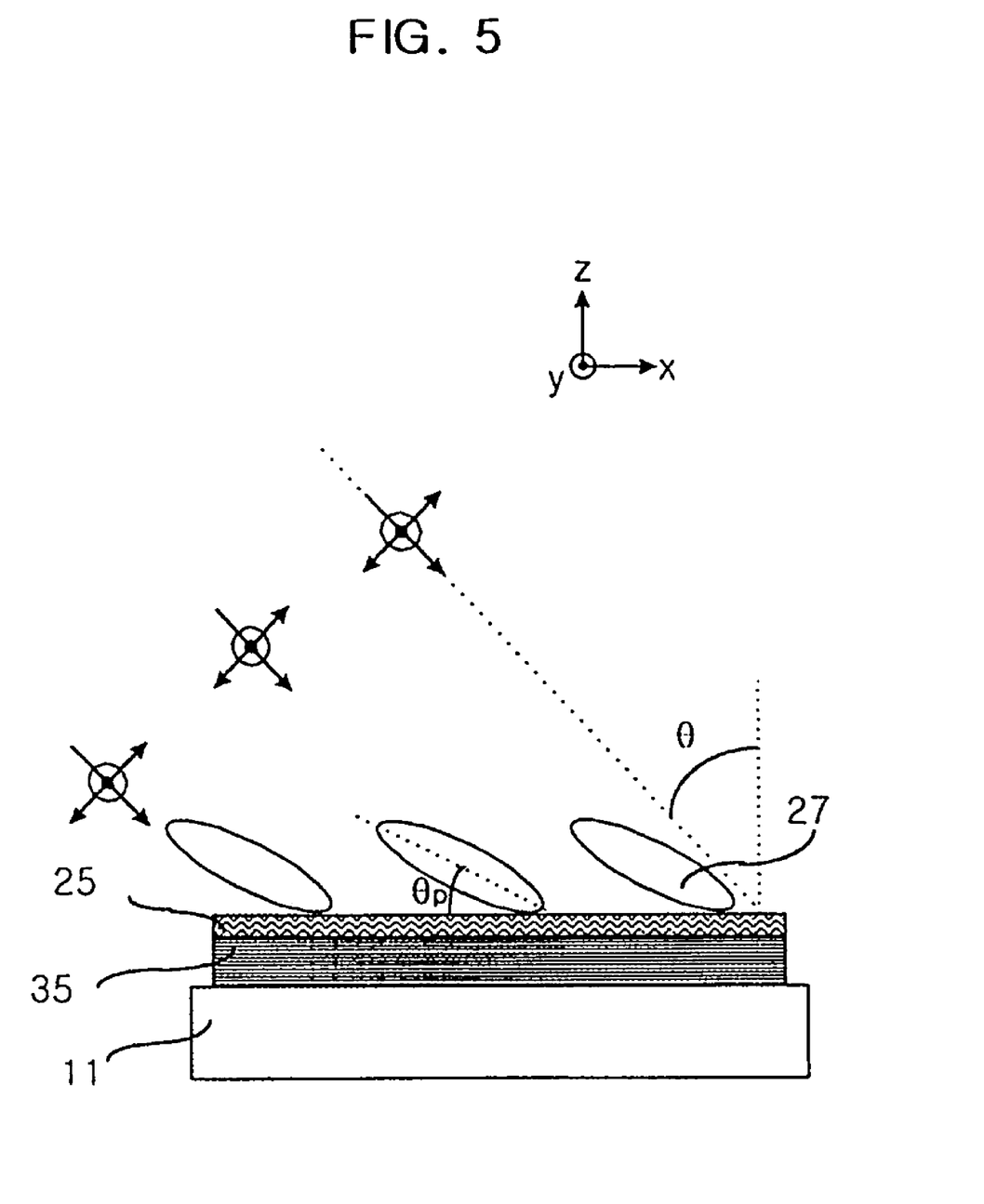
FIG. 5 is an xz-plane view which shows how to control a pretilt angle of an alignment layer according to the present invention.

FIG. 5 is an xz-plane view which shows control of the pretilt angle of an alignment layer in the light irradiating device according to the present invention. The pretilt angle (θp) of liquid crystal molecules 27 in the alignment layer 25 is controlled by the amount of light energy irradiated on the alignment layer, the alignment layer material, or the polarization degree of the light irradiating device. The alignment direction of the liquid crystal molecules 27 is determined by the direction of irradiation in the slanted exposure.

The available light irradiating angle (θ) is preferred to be in the range of about 0°~45°, and if the light irradiation angle (θ) is greater than about 45°, then the effect of a gap error between the mask 13 and the alignment layer 25 is maximized, so that the pattern position error in the alignment layer, caused by the mask pattern, will be big.

The following table shows pattern position error as a function of light irradiating angle (θ) in the case of the gap error between the mask 13 and the alignment layer 25 being about 20 μm.

| light irradiating angle (θ) | 0° | 30° | 45° | 60° |
|---|---|---|---|---|
| pattern error | 0 μm | 11.5 μm | 20 μm | 34.6 μm |

Figure 6A:
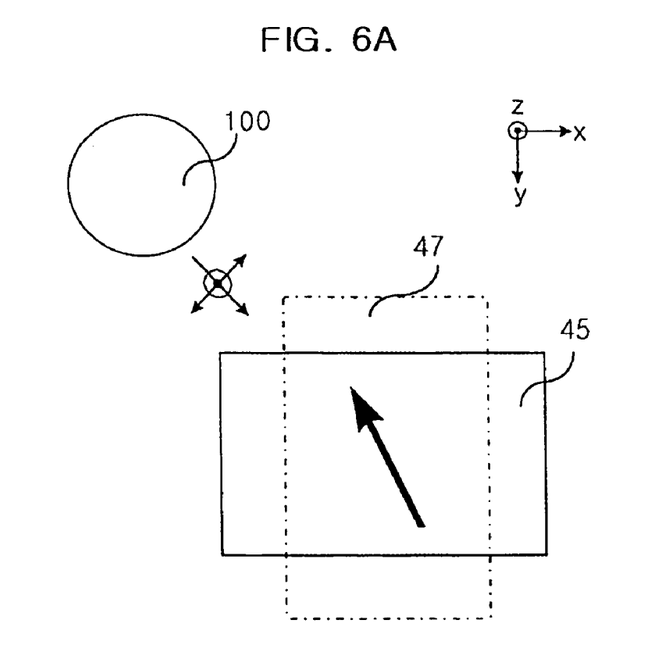
FIGS. 6A, 6B, 6C are xy-plane views of the first, second, and third embodiments of the present invention which show how to control the alignment direction of an alignment direction of an alignment layer of the present invention.
Figure 6B:
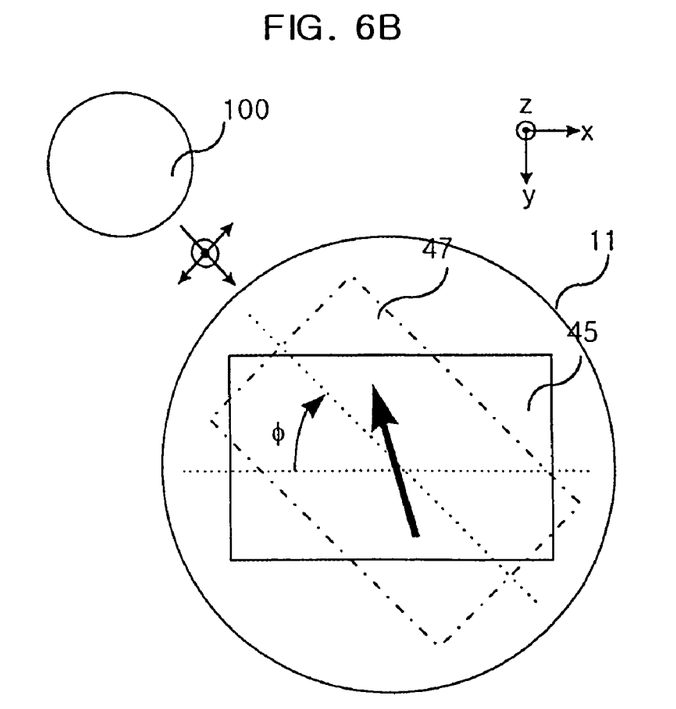
Figure 6C:
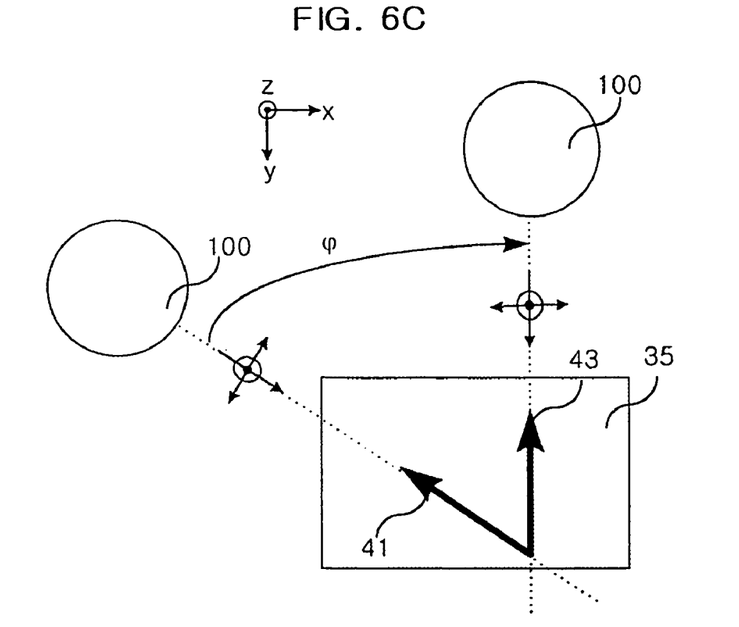

FIGS. 6A, 6B, and 6C are xy-plane views of first, second, and the third embodiments of the present invention representing control of the alignment direction of the alignment layer. In these figures, the thick solid line arrow represents the alignment direction of the substrate; the solid line rectangle represents a first position 45 of the substrate, and the single-dotted line rectangle represents a second position 47 of the substrate.

As described above, in the light irradiating device of the present invention, the light irradiation direction (i.e., azimuth angle of light) on the substrate in the photo-alignment process is important because the alignment direction is determined by the light irradiation direction in slanted exposure. The method of controlling the azimuth angle of the light is represented in FIGS. 6A, 6B, and 6C.

As in the first embodiment in FIG. 6A, in producing a mono-domain or a multi-domain liquid crystal display device, to make the alignment direction to be 0° or 90° (45° or 135°) with respect to the length direction of the substrate, the optical system 100 is arranged to be about 0° or 45° with respect to the length direction of the substrate because it is achieved by simply rotating the substrate by about 90°.

Therefore, to form a certain alignment direction, the arrangement in FIGS. 6B and 6C is preferable, and 6C is more preferable. FIG. 6B shows that the desired alignment direction is easily formed by rotating the stage 11, on which the substrate is placed, by an angle (φ). But, in the above arrangement, to produce a multi-domain liquid crystal display device, the gap between the mask and the substrate must be maintained in order to rotate the mask together. FIG. 6C shows that the multi-domain, which has two or more alignment directions in the liquid crystal area, is realized by moving the optical system 100 by an angle (φ) and then forming first and second alignment directions.

Figure 7:
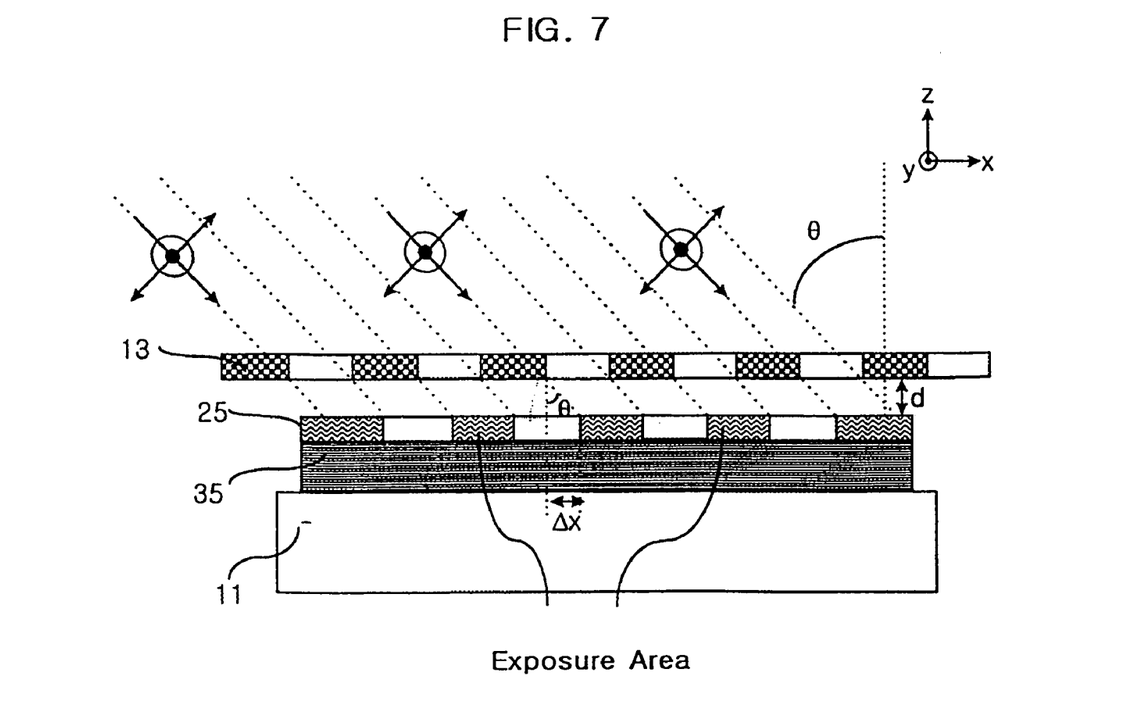
FIG. 7 is an xz-plane view which shows an exposure area of an alignment layer of the present invention.

FIG. 7 is an xz-plane view that shows an exposure area of an alignment layer of the present invention. When the mask is used to produce the multi-domain liquid crystal display device, a specific gap has to be maintained between the mask 13 and the alignment layer 25 on the substrate 35, and the gap is preferred to be about 30 μm~100 μm.

As represented in the above figures, if the light, incident with an angle (θ), is irradiated on the alignment layer 25 through the mask 13, the exposed area is moved by Δx (Δx=dtanθ) with respect to said angle, and then the mask 13 pattern is formed in the moved position.

Therefore, in the practical photo-alignment process, a specific gap has to be maintained between the mask 13 and the substrate 35, and the mask and the substrate is preferably placed parallel. Also, after the gap is measured precisely, the substrate must be moved from the initial position according to the measured gap and irradiating angle, and then the light is irradiated.

In order to do as described above, a gap measuring device 36 is preferable, and a supplementary light source (e.g., laser) is preferably used to measure the gap. Three to four gap positions to be measured are selected. To decrease gap errors between the measured positions, gap correction devices 38 are installed under the stage 11.

According to the light irradiating device of the present invention, the alignment direction of the alignment layer and pretilt angle can be determined by irradiating only one time by placing the polarizer obliquely at an angle with respect to the stage on which light is irradiated, and then irradiating partially polarized light obliquely.

Also, a large scale and multi-domain liquid crystal display device can be effectively realized by measuring the gap between the mask and the substrate precisely, and then forming a uniform pattern on an alignment layer.

It is further understood by those skilled in the art that the foregoing description is a preferred embodiment of the disclosed invention and that various changes and modifications may be made in the invention without departing from the spirit and scope thereof. Thus, it is intended that the present invention cover the modifications and variations of this invention provided they come within the scope of the appended claims and their equivalents.

What is claimed is:

1. A light irradiating device, comprising:
   an optical system including a first light source, a lens and a reflective mirror;
   a first polarizer partially polarizing light from said optical system, wherein the first polarizer includes a plurality of glass plates held by a polarizer holder having a lattice structure and an optically absorptive material for absorbing light reflected by the glass plates;
   a second polarizer disposed between said lens and said reflective mirror;
   a mask disposed between the first polarizer and the substrate;
   a second light source for measuring a gap between the mask and the alignment layer; and
   at least one gap correction device connected to the stage.

2. The light irradiating device according to claim 1, wherein said optical system includes one or more reflective mirrors.

3. The light irradiating device according to claim 1, wherein the glass plates include quartz.

4. The light irradiating device according to claim 1, wherein the glass plates in the first polarizer are slanted at Brewster's angle with respect to said substrate.

5. The light irradiating device according to claim 1, wherein said second polarizer includes a polarizer substrate comprising one of a group consisting of a laminated glass substrate.

6. The light irradiating device according to claim 1, wherein said second polarizer includes a polarizer substrate comprising a laminated quartz substrate.

7. The light irradiating device according to claim 1, wherein said second polarizer includes a polarizer substrate comprising a multi-coated substrate.

8. The light irradiating device according to claim 7, wherein said polarizer substrate is a multi-coated substrate coated with an inorganic layer.

9. The light irradiating device according to claim 1, wherein said second polarizer is slanted at Brewster's angle with respect to said substrate.

10. The light irradiating device according to claim 1, wherein the light from said first polarizer has a wavelength in the range of about 200 nm~800 nm.

11. The light irradiating device according to claim 10, wherein the light from said first polarizer has a wavelength in the range of about 250 nm~400 nm.

12. The light irradiating device according to claim 1, wherein said first polarizer has a polarization degree of about 0~1.

13. The light irradiating device according to claim 1, wherein said first polarizer has a polarization degree of about 0.2~0.95.

14. The light irradiating device according to claim 1, wherein said angle is about 0°~45°.

15. The light irradiating device according to claim 1, wherein said stage is rotatable.

16. The light irradiating device according to claim 1, wherein said optical system is rotatable.

17. The light irradiating device according to claim 1, wherein the gap is about 20 µm.

18. The light irradiating device according to claim 1, wherein the gap is about 30 µm~100 µm.

19. The light irradiating device of claim 1, wherein the second light source includes a laser.

20. A light irradiating device, comprising:
a first light source;
a first reflective mirror reflecting light from said first light source;
a homogenizer including a plurality of lenses;
a second reflective mirror reflecting light from said homogenizer;
a collimator lens outputting light rays from said second reflective mirror to be parallel;
a first polarizer partially polarizing light from said collimating lens, wherein the first polarizer includes a plurality of glass plates held by a polarizer holder having a lattice structure wherein the polarizer holder includes an optically absorptive material for absorbing light reflected by the glass plates;
a second polarizer disposed between said first reflective mirror and said homogenizer;
a mask disposed between the first polarizer and the stage and parallel with the substrate;
a second light source for measuring a gap between the mask and the alignment layer; and
a gap correction device connected to the stage.

21. The light irradiating device according to claim 20, further comprising a third polarizer disposed between said homogenizer and said second reflective mirror.

22. The light irradiating device according to claim 20, wherein the substrate has an alignment layer, and wherein an alignment direction and a pretilt angle of the alignment layer are determined by a single oblique irradiation.

23. The light irradiating device according to claim 20, wherein the gap is about 20 µm.

24. The light irradiating device according to claim 20, wherein the gap is about 30 µm~100 µm.

25. The light irradiating device according to claim 20, wherein the homogenizer includes one of a compound lens and a fly eye lens.

26. The light irradiating device according to claim 20, wherein the homogenizer includes one of a convex-type and a concave-type.

27. The light irradiating device of claim 20, wherein the second light source includes a laser.

* * * * *